(12) United States Patent
Hardy et al.

(10) Patent No.: US 9,955,231 B2
(45) Date of Patent: Apr. 24, 2018

(54) RELEVANT VIDEO CONTENT PUSHED TO A MOBILE PHONE

(71) Applicant: DISH TECHNOLOGIES L.L.C., Englewood, CO (US)

(72) Inventors: Christofer Hardy, Cheyenne, WY (US); Thomas A. Yarborough, Cheyenne, WY (US)

(73) Assignee: DISH Technologies L.L.C., Englewood, CO (US)

( * ) Notice: Subject to any disclaimer, the term of this patent is extended or adjusted under 35 U.S.C. 154(b) by 118 days.

(21) Appl. No.: 13/831,071

(22) Filed: Mar. 14, 2013

(65) Prior Publication Data

US 2014/0282709 A1    Sep. 18, 2014

(51) Int. Cl.
| | |
|---|---|
| H04N 7/10 | (2006.01) |
| H04N 7/025 | (2006.01) |
| H04N 21/61 | (2011.01) |
| H04N 21/442 | (2011.01) |
| H04N 21/25 | (2011.01) |
| H04N 21/258 | (2011.01) |

(52) U.S. Cl.
CPC ....... *H04N 21/6181* (2013.01); *H04N 21/251* (2013.01); *H04N 21/258* (2013.01); *H04N 21/25841* (2013.01); *H04N 21/25883* (2013.01); *H04N 21/25891* (2013.01); *H04N 21/442* (2013.01); *H04N 21/44204* (2013.01); *H04N 21/44213* (2013.01); *H04N 21/44222* (2013.01)

(58) Field of Classification Search
CPC ............ H04N 21/6181; H04N 21/251; H04N 21/254; H04N 21/25841; H04N 21/25883; H04N 21/25891; H04N 21/442; H04N 21/44204; H04N 21/44213; H04N 21/44222
USPC .................................. 725/34, 35, 14, 16, 46
See application file for complete search history.

(56) References Cited

U.S. PATENT DOCUMENTS

| | | | |
|---|---|---|---|
| 7,644,427 B1* | 1/2010 | Horvitz et al. ................. 725/46 |
| 8,712,218 B1* | 4/2014 | Begeja et al. ................. 386/262 |
| 2003/0095791 A1* | 5/2003 | Barton et al. .................... 386/83 |
| 2009/0144776 A1* | 6/2009 | Walter et al. ................... 725/47 |
| 2010/0291861 A1* | 11/2010 | Anzures et al. ............ 455/3.01 |
| 2010/0306708 A1* | 12/2010 | Trenz .................... G06F 3/0482 715/853 |
| 2011/0145850 A1* | 6/2011 | Ng et al. ......................... 725/14 |
| 2012/0059825 A1* | 3/2012 | Fishman et al. ............. 707/737 |
| 2013/0047180 A1* | 2/2013 | Moon et al. .................... 725/30 |
| 2013/0111512 A1* | 5/2013 | Scellato et al. ................ 725/14 |
| 2014/0089953 A1* | 3/2014 | Chen et al. ....................... 725/1 |

* cited by examiner

*Primary Examiner* — Nnenna Ekpo
(74) *Attorney, Agent, or Firm* — Seed IP Law Group LLP

(57) ABSTRACT

The present disclosure relates to systems and methods used to identify video content that may be of interest to a viewer by examining the viewing habits of the viewer's geographic marketing area, recommendations from the viewer's social media sites, the viewer's past viewing patterns, the viewer's demographic information, the viewer's preferences, and the viewer's past purchase history.

13 Claims, 6 Drawing Sheets

RELEVANT VIDEO CONTENT PUSHED TO A MOBILE PHONE

BACKGROUND

Technical Field

The present disclosure relates to systems and methods to identify video content that may be of interest to a user and to suggest that content to the user by using the content the viewer has previously viewed, the viewer's social media connections, crowd sourcing, and predictive models relevant to the user.

Description of the Related Art

There are a number of ways that users can identify content that they may be interested in watching or listening to. For example, music listeners may decide that they will like the music that other people are listening to, and identify songs to listen to based on popularity in rankings such as the "Hot 100," "Billboard 200" or other similar ratings publication. However, these ratings do not extend to video content, nor do they describe those specific items of content that large numbers of people are viewing within a particular geographic area at the current time.

There are other services, for example "EQuala" and "Pandora" that allow listeners to receive suggestions of songs they may like or have the songs automatically added to their playlist. EQuala allows users to identify friends and others with whom they share similar music tastes, and then receive music lists and suggestions from those people by adding them to lists within the EQuala website. However, this extends to music only and does not extend to general social media sites on the Internet. Pandora allows users to identify preference information such as music artists, music genres, and examples of songs the user likes, and generates suggestions for songs and/or creates playlists for the user.

BRIEF SUMMARY

Through the systems and methods disclosed, video content that a viewer may like to watch is identified or sorted and presented to the user without the user having to spend time looking through programming guides for thousands of channels, or sifting through random channels of video content to locate programs of interest. This is accomplished in two principal ways. First, within a geographic marketing area that the viewer belongs to, which is typically served by one or more central control systems for distributing content, viewing preferences within that area will be examined, cataloged and used to suggest content that a particular viewer in that area may be interested in. In some cases there may be special circumstances where a content item, for example from a movie, a television show, a news broadcast or news special report, is being watched by a majority of the viewers within a geographic marketing area. A person within that marketing area will want to be notified if a majority of people are watching a particular content item, because there is a high likelihood that the person may be interested in that content item as well.

Second, the system predicts current content, or future content that a viewer may be interested in by capturing and analyzing the viewer's past content viewing history; demographic information such as sex, age, marital status, etc; and viewing preferences of the viewer's friends, which may be found on the viewer's social media sites such as Facebook, Google, or Twitter, the social media sites the user frequents. In addition, the user may have specific preferences for program genres, favorite directors, actors, writers or producers that can be used to identify content the user would be interested in.

The system aggregates this information and uses it to provide suggestions to the user's smartphone device to ask if the user would like to watch or record the content. This aggregated data is stored in a personality user database for each user in the system. In addition to providing a viewer suggestions of content to view, this data may also be aggregated into a marketing database which can then be used to more effectively and efficiently target specific viewers with products and services that would be most relevant for them.

DETAILED DESCRIPTION

With the increased number of channels available that carry video content, in some cases over 1000 channels, using crowd sourcing or predictive models can provide an efficient, useful way to identify content that a viewer would like to watch, without having the viewer go through hundreds of pages of programming guide content to find shows the user might be interested in watching.

With the systems and methods disclosed, the viewer can quickly determine what content would be interesting and relevant to watch, either to immediately begin viewing or to record for later viewing. In one or more embodiments of a system a viewer can use the viewing habits of others in the viewer's geographic area to determine content items of interest that the viewer may want to view. In a first embodiment, within the viewer's geographic marketing area, a high percentage of views for a particular content item may indicate the viewer would likely be interested in viewing this content as well. For example, there may be a televised sporting event involving a local team may be widely watched in the viewer's geographic area, or breaking news or a special report involving a catastrophic event in a particular location that is being widely watched by many viewers in one area that the viewer would be interested in.

In addition to a geographic marketing area's viewing habits, recommendations for content for a viewer may also be based from predictive models and heuristics based on collected data. For example, analyzing the content titles the viewer has watched in the past; preferences the user has for types of shows, actors, directors, or producers; demographics information about the user, for example whether the user is male or female, married or unmarried and other preference information may be used to identify which video content a user may be interested in. In addition, the system can interact with and use information from a viewer's social media site, such as Facebook or Twitter, to determine the likes and dislikes of video content that the viewer or the viewer's friends have posted there.

The system in some embodiments aggregates this information and not only presents suggestions to the viewer asking whether specific content should be viewed or recorded, but also uses this information for multiple viewers to build marketing information systems and databases that can be used to efficiently and effectively target goods and services to specific viewers or groups of viewers.

Figure 1:
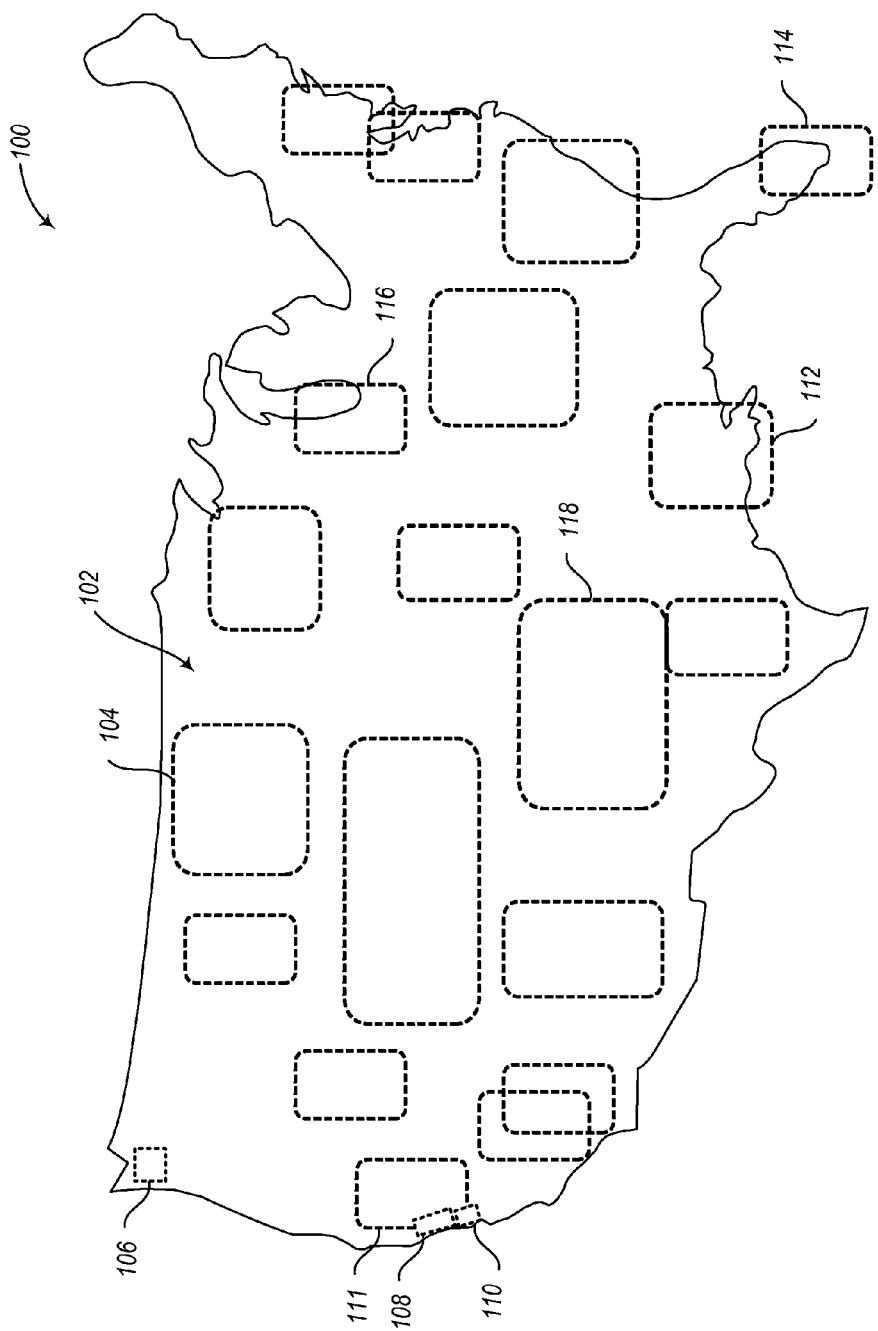
FIG. 1 shows an example of specific marketing areas that are served by one or more central control systems.

FIG. 1 shows diagram 100 which is an example of geographic marketing areas 102 distributed throughout the United States. These marketing areas 102 are typically selected because of geographic layout, a commonality of industries, and the socio-economic profile of people within the area. General marketing data, economic data, sales data, household profile data, and other statistics and measurements are typically aggregated by these geographic marketing areas.

The location and size of the marketing areas as shown in FIG. 1 are examples only with potential marketing areas and are provided to illustrate the different areas which may be created. The areas may be relatively large, such as area 118 which includes parts of New Mexico, Texas including the panhandle, a significant portion of Oklahoma and some section of Arkansas. This area may be considered the Seven High Plains area. The people who live in this demographic area, even though they span several states have a number of features in common based on the type of land, the industries in the area and other common features. Some markets may be relatively small, such as geographic area 108 which includes San Francisco and the Bay area including Marin County, but does not extend down to Sunnyvale, Mountain View or other areas that are part of Silicon Valley. The area 109, on the other hand, includes the high tech area of Silicon Valley, which is Palo Alto, Mountain View, Sunnyvale and other towns generally considered part of the Silicon Valley high tech corridor, which is a distinct geographic region from the San Francisco Bay area 109. Similarly 110 is the greater Los Angeles area which includes Hollywood, but does not include Orange County or San Diego. The area 106 includes the greater Seattle area, but does not include any of the regions east of the Cascade Mountains or west of Puget Sound, since these are very distinct social areas and the people living in the Seattle area have different social interests than people living in the Olympic Peninsula in such cities as Forks and Port Angeles.

Accordingly, one of the data points that is determined and stored about a user is the social geographic area in which the user resides. The social geographic area is more than just the pure geographic area, rather it is that portion of a geographic area in which the majority of users have a common social interest.

In the examples shown, the social geographic areas are generally divided according to large cities, such as area 116 which is the greater Chicago area, the area 112 which is the greater New Orleans area, or the area 114 which is the greater Miami, south Florida area. On the other hand, the social geographic areas can be a plurality of states, as in the example of social geographic areas 118 and 104, each of which cover multiple states, but which have common social groupings in the adjacent state areas.

The system, by observing the social media sites, the viewing habits and the purchasing content of people in geographic areas is able to create the size and boundaries of the social geographic areas. Namely, the database has available to it and obtains all the viewing habits, the social media interaction, the media likes and dislikes and the other social web activities associated with users across the entire United States. The system then analyzes the collected data in order to create groupings of common social geographic areas. For example, the system may recognize that 80% of a group people within a certain area code never watch movies on weekdays and only watch movies on a Friday or Saturday evening. In addition, by examining the contents of the media which is viewed and the likes and dislikes of the users within a geographic area, it notes that 80% of the video content viewed can be classified as a western, relates to horses or some aspect of farming or agriculture. The system, since it is obtaining data across the entire United States, is able to examine the data across multiple state lines and can create a social grouping based on the geographic area of users by examining their viewing habits over several weeks or months. The system is also able to change the size of the social geographic area, for example, the system may recognize that viewers within a small geographic area 106 that corresponds to the greater Seattle area enjoy watching romantic movies, such as Sleepless in Seattle, or other movies that take place in the greater Seattle area, such as the Twilight Saga and the like. The system may recognize that even traveling a short distance from Seattle the viewing habits drastically change so the viewers that live in Ellensburg, which is within a 40 minute driving distance of Seattle, may have a very different set of viewing habits than those who live in the Seattle area itself. Accordingly, the system recognizing the difference in viewing habits will modify the boundary of the geographic area based on the data that it collects and examines.

As another example, the system may recognize that within the greater Miami area 114 there are a large number of viewers that watch Spanish language stations and have an affinity for Spanish programming and a particular high interest in Cuban news. However, just a short distance north of the greater Miami area, the interest in such programming may approach zero so that a sharp boundary can be found by carefully examining the social media and viewing habits of users and organizing it in a database.

In summary, as shown in FIG. 1, a plurality of social geographic areas 102 have been created by the system which collects the data, sorts the database by a number of different criteria described herein and then, based on the sorting, creates a geographic area in which a majority of the users within the area share common interests. The areas may overlap, such as 108 and 109 overlapping with the larger northern California area 111 or the areas on the east coast of eastern Virginia overlapping with the Maryland area right in the area that corresponds to Washington, D.C. Thus, creating two distinct areas, Maryland and Virginia, and an overlapped area which, by itself, has distinct social geographic habits.

For central control system providers, these marketing areas will be served by one or more central control systems 206 for distributing video content, which in one or more embodiments may consist of cable or satellite "head end" systems that store and deliver content to viewers.

Figure 2:
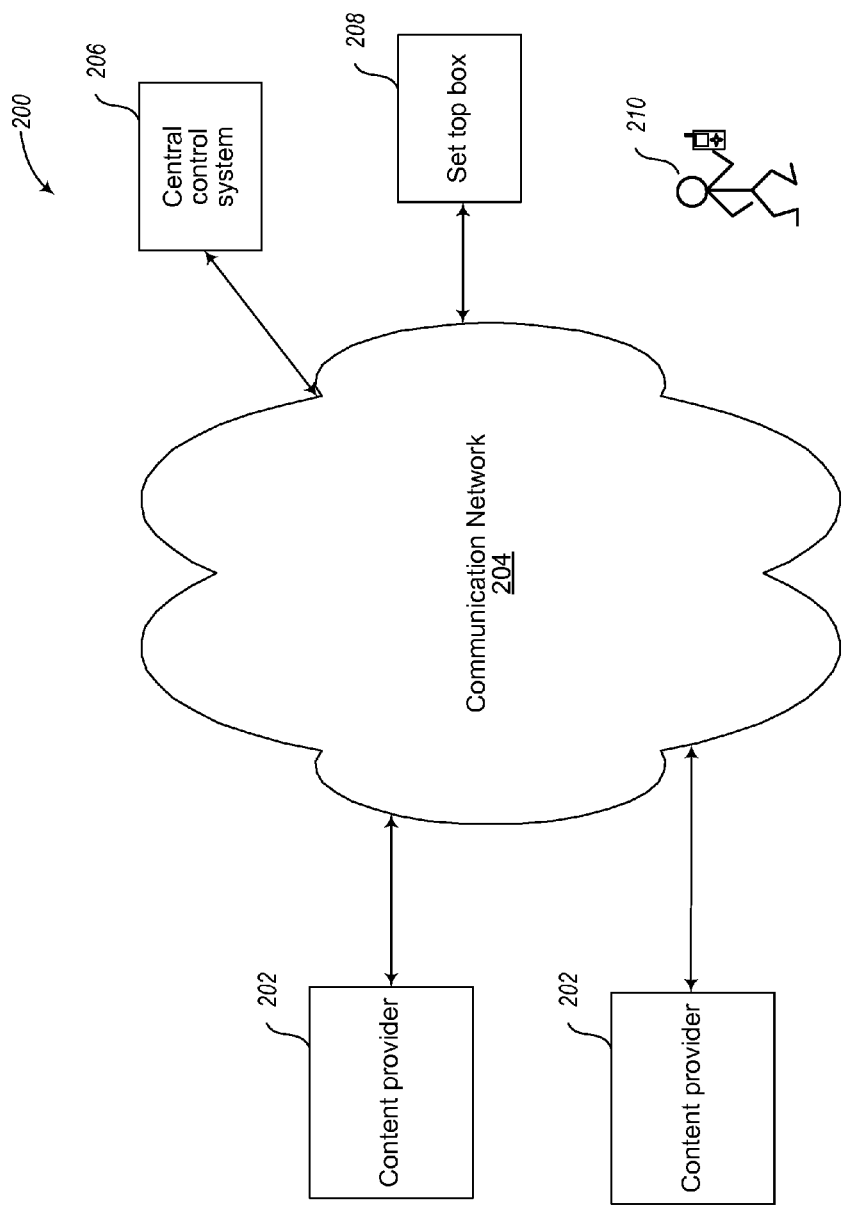
FIG. 2 is a context diagram that shows the relationship between content providers, a central control system and a set top box.

FIG. 2 shows diagram 200 which is an embodiment of a context example of content providers 202, set top boxes 208, and a central control system 206. Content providers 202 create and distribute video content such as movies, television series, television specials, sports events, documentaries, news specials, and other types of content. Examples of content providers are ABC, NBC, CBS, HBO, Showtime, AMC, local stations, and the like. Content providers 202 make the content available through a communications network 204 which may include satellite systems, cable systems, or Internet networks. This content is received by a central control system 206, which then distributes the content to the various set top boxes 208 according to the various service agreements the central control system provider has with each viewer. One viewer may be associated with several set top boxes 208, or several viewers may be associated with one set top box.

For example, AMC as a content provider 202 provides a television series "Walking Dead" which is received by central control system 206. Subscribers to the service that operates the central control system 206 may have access to the series episodes by either watching the episode during its normal viewing timeslot, or by allowing viewer 210 using the set top box 208 to download an episode from the central control system 206 for viewing on demand. There may be hundreds of content providers 202, providing content over thousands of channels that are available from the central control system 206. In addition, the central control system may offer pay per view (PPV) where viewer 210 purchases individual items of content from the central control system for use during a fixed period of time, for example for 48 hours. The central control system 206 typically provides a program guide list that describes what content items are available for review on what channels at what times.

The central control system 206 knows the physical geographic location of each set top box 208 within its system and to which it provides programming. In addition, the feedback between the set top box 208 and the central control system provides information as to what programs are being viewed within every geographic area it provides. Accordingly, the central control system can collect data based on programs being viewed, including the genre, the actors and all the other metadata associated with a particular program for any given set of set top boxes 208 within the geographic area that it serves and can use this data to subdivide the geographic area it serves into different types of social media groups. While the central control system 206, the set top box 208 or the content providers 202 may know of a viewer's past viewing history and geographic location, but they do not generally know of a viewer's shopping preference for certain items nor do these systems have any integration with viewer web surfing preferences, demographics information, or social media content to predict a viewer's preference for a future content item. Accordingly, it is preferred to have a database that aggregates all this information.

Figure 3:
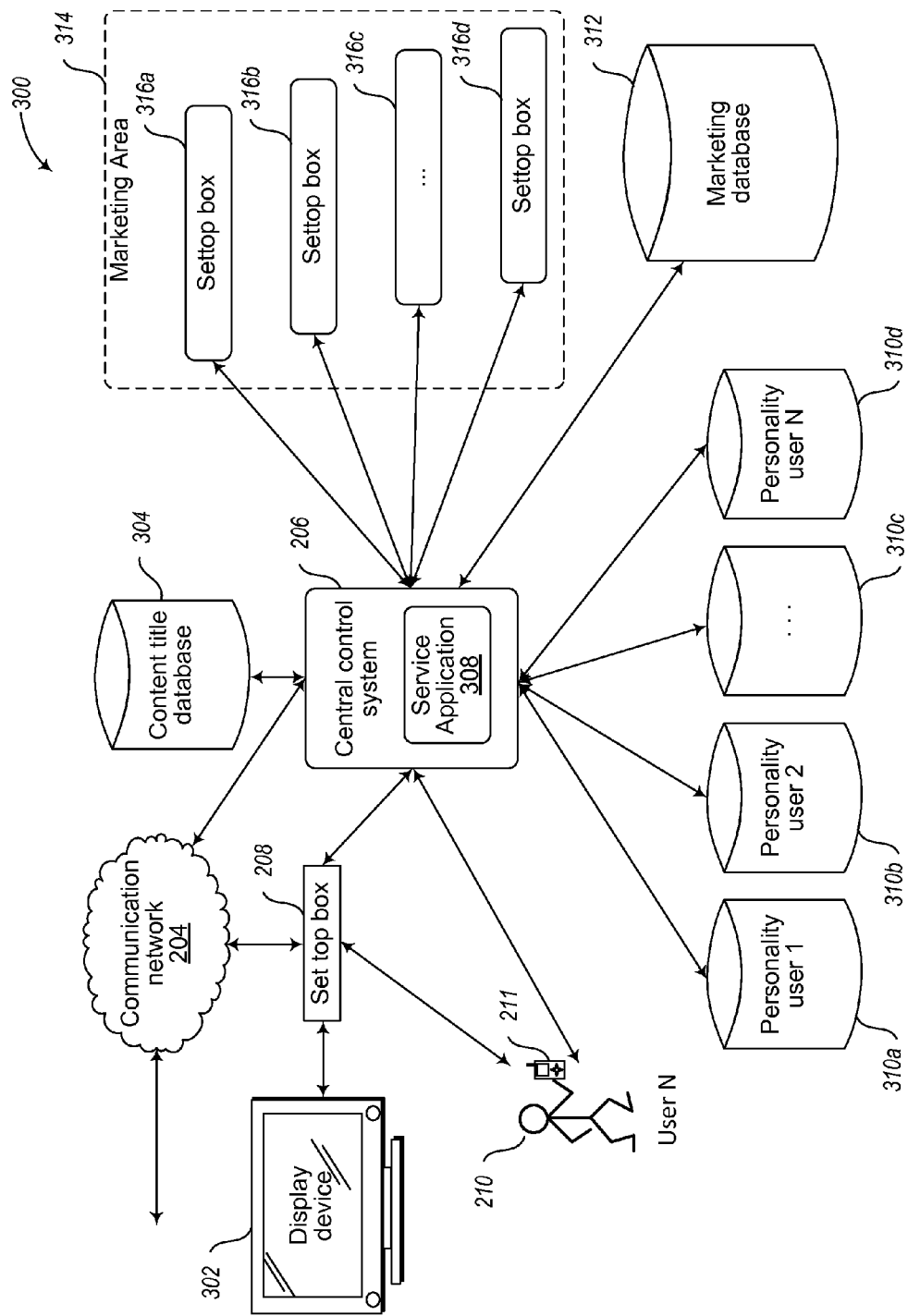
FIG. 3 is a schematic diagram of an example embodiment of a server application on a central control system that manages data for different personality users, and acquires viewing data from set top boxes within a user's marketing area.

FIG. 3 shows diagram 300 that provides more detail for one embodiment of a central control system 206 that contains server application 308 used to implement the disclosed system and methods. Central control system 206 is able to communicate with set top boxes 316a-316d within a geographic marketing area 314. The set top boxes, which may number into the multiple thousands, are used by individual viewers under a subscription service to the central control system 206 operator. In one or more embodiments, the central control system 206 is able to determine the video content currently being displayed through each set top box to estimate how many people are watching a particular content item, such as a movie, a news item, or special report. If the percentage of viewers within the geographic marketing area is high enough, the system will notify other viewers within the marketing area that they may be interested in viewing the content for either immediate display on display device 302 through set top box 208, or for recording for later viewing using the digital video recording functionality of set top box 208.

As one example, the central control system 206 may recognize that 60% of the households in a particular area are tuned to viewing a particular event, and that the vast majority of these households changed to begin viewing that event within the last 10 minutes. Assume, for example, that the event is the demolishing of the King Dome as it was being blown up with dynamite. While the control system 206 does know with particularity the type of event, what it does recognize is that over a very short period of time, the users viewing a particular event has gone from a very low number to a very high number, for example 60% of the users. The control system can, therefore, send a notice out of the remaining 40% of the users within the same social geographic area asking them if they wish to change station and can display a running text screen stating that the change of station will show them the demolition of the King Dome as it is being blown up with dynamite. Thus, viewers in the same social geographic area will be alerted to particular events of very high interest within their social area which they may have missed but for the notification which was sent to them out of the central control system, either by sending to the set top box 208 or to the mobile communication device 211 held by the user 210.

Central control system 206 is also able to communicate with content title database 304 which holds video title names, descriptions, show times, permissions, and other information that can be used to determine which content a viewer 210 may be interested in viewing or recording. The central control system 206 also has access to the communications network 204. The central communication network 204 is one part of the World Wide Web and includes the Internet and websites thereon. In most homes, the set top box 208 is connected a hardwire cable to the Internet of the user in the home as shown by the arrow connection between the communication network 204 and the set top box 208. In other homes, the set top box 208 is coupled to the user's telephone system either by a telephone plug in the back of the set top box 208 or by a connection through a cellular phone service to the user's mobile device or via the Internet connection 204 and then to the user's mobile phone 211. Accordingly, the connections to a set top box which may include other connections besides a landline phone, an Internet, or a cell phone connection, provides significant information to the central control system 206 about the owner and user of the set top box 208. The central control system, therefore, knows the Internet address and website of the user in the house, as well as their cell phone communication data and their landline communication channels. The central control system 206 also knows the name of the people who signed the contract with the cable company to set up the set top box 208 and their address and, therefore, having the person's name and physical address provides sufficient information that social web sites such as Facebook, Twitter and the like can be checked to determine whether a person having the same name and the same or similar address has social media sites under their own under which they do postings. Thus, through various links to the various databases, the central control system is able to determine and analyze a user's Internet resources, such as a viewer's social media networking sites, for example Facebook and Twitter, to query the information in these sites to determine the recommendations and preferences for content that the viewer has liked or that the viewer's friends have that can be used to determine what viewer 210 may be interested in viewing or recording for later viewing.

Central control system 206 uses this data to create personality user databases 310a-310d. Each viewer that is a subscriber to the service that is managed by the central control system will have a separate personality user database including the viewer's viewing habits, preferences, friend's viewing preferences and recommendations, and the like. Data from the personality user database is used to determine content recommendations for a user, as well as provide aggregated viewer information data to be used for marketing and advertising sales.

In one embodiment, the central control system 206 is able to communicate directly with viewer 210 and the viewer's smartphone to alert the viewer of content of interest. If the viewer 210 wishes to view or record the offered content, the system 206 will then update the viewer's personality user database 310a to reflect that the viewer like that content, and also ask the user, for example by sending a message to the users smartphone, if the user would like to play the content on the user's smartphone device or display device 302, or record the content on the viewer's set top box 208 for later viewing.

The central control system also manages and updates marketing database 312 which aggregates all of the collected data and preference information such that the data can be used for targeted direct marketing of products and services, and advertising sales.

Figure 4:
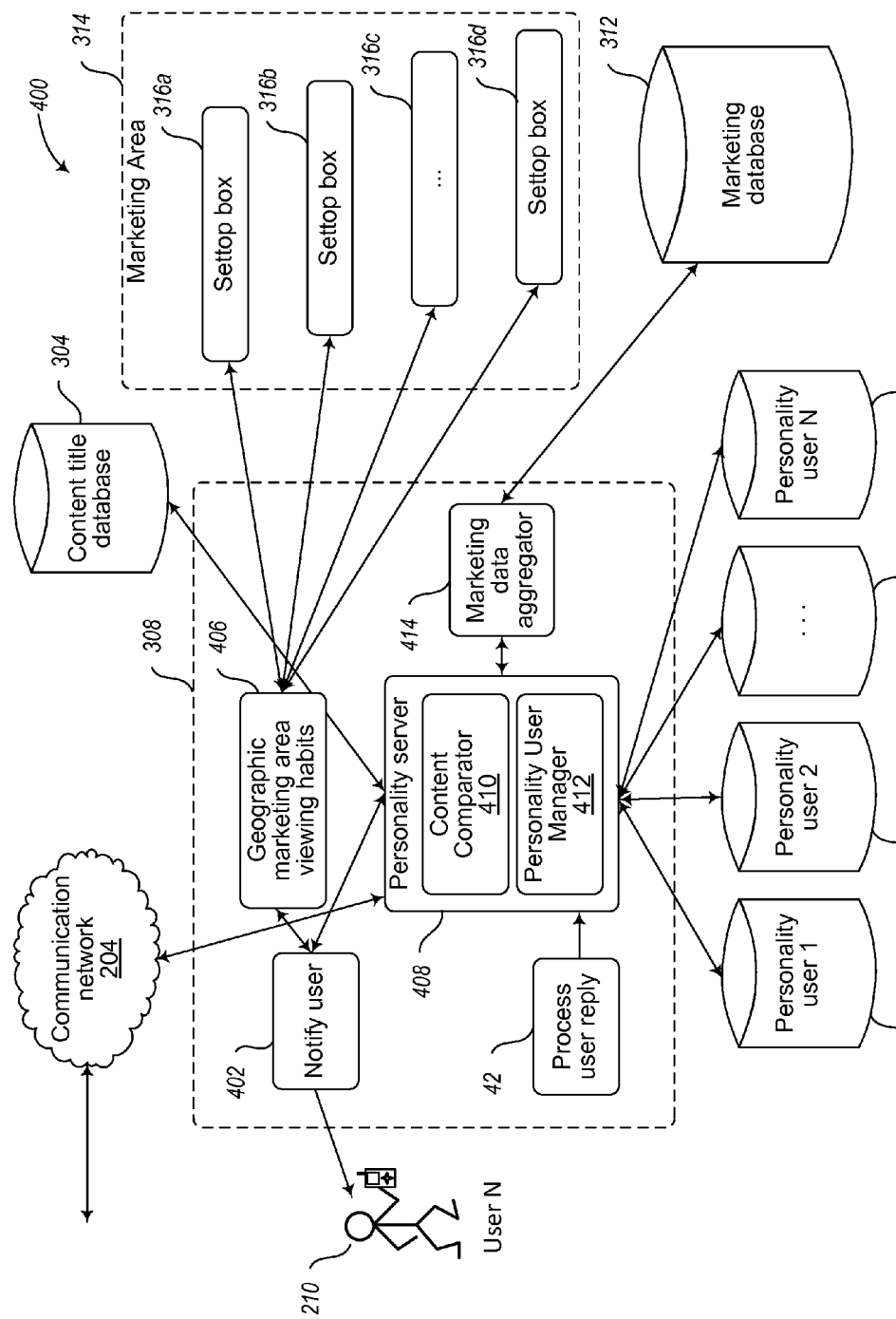
FIG. 4 is a schematic diagram of one embodiment of a central control system server application.

FIG. 4 shows diagram 400 that provides more detail for one embodiment of server application 308 within central control system 206. Server application 308 consists of, among other components, a geographic marketing area viewing habits module 406, and a personality server module 408. The geographic marketing area viewing habits module 406 in one or more embodiments is configured to receive the currently playing titles on the set top boxes 316a-316d within the geographic marketing area 314, to determine the video content currently being displayed through each set top box to estimate how many people are watching a particular content item, such as a movie, a news item, or special report. If the percentage of viewers within the geographic marketing area is high enough, the system will notify viewer 210 and ask if they may be interested in viewing the identified content either for immediate display or for recording for later viewing using the recording functionality of set top box 208.

The personality server 408 consists of a content comparator sub-module 410 and a personality user manager sub-module 412. The content comparator 410 retrieves personality user data for a particular viewer 310a and will compare that data, which contains preference information based on prior content views, user preference data, and social media recommendations, against content title database 304 that describes the current and future content titles available through the central control system 206. The viewer 210 is notified if there are content matches sufficiently close to the viewer's preference so that the viewer can immediately view or schedule a recording of the matched content. The viewer 210 is notified about the matched content through the notify user module 402. In one or more embodiments module 402 will notify viewer 210 of the available content through the viewer's smartphone device. The viewer's requested action regarding the content is received by the process user reply module 404, and that data is then accepted by the personality user manager 412 to update the personality user database 310a for viewer 210.

In one or more embodiments, content comparator 410 knows of relationships among the titles in the content title database 304, and will associate matches with related titles. For example, if the content comparator identifies a viewer's interest in "Lord of the Rings" and the content comparator already associates this title with "The Hobbit," then the comparator will also provide "The Hobbit" as a match.

Server application 308 also includes a marketing data aggregator module 414 that receives data from the marketing area viewing habits module 406 and personality server module 408, which includes data from each personality user database 310a-310d. Marketing data aggregator module 414 receives this data, organizes it to allow for targeted marketing of goods and services to viewers and for advertising sales. This data is kept in marketing database 312. In some embodiments, marketing database 312 is made available to other vendors to promote goods and services on a subscription basis.

Figure 5:
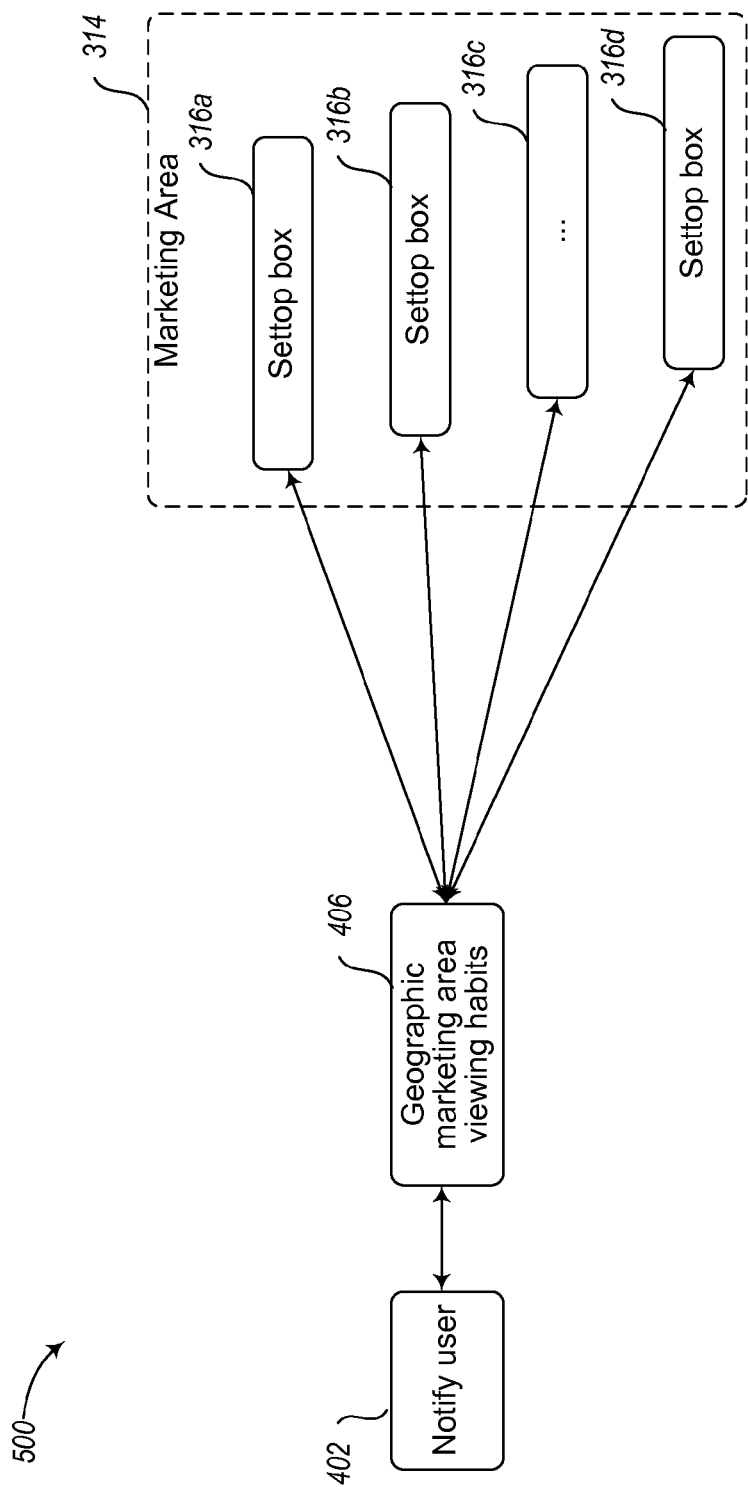
FIG. 5 is a block diagram of an example of a marketing area viewing habits component of a central control system server application.

FIG. 5 shows diagram 500 which is an embodiment of marketing area viewing habits module 406. In one embodiment, module 406 queries on a regular basis the set top boxes 316a-316d that are found within a geographic marketing area 314. In one embodiment, the query may be for the content that is currently being presented on a display device 302. In other embodiments, module 406 could query a set top box for other information that suggests popular content across the geographic marketing area 314, such as content that is currently recorded on a digital video recording device, or content that is being time shifted. Module 406 then analyzes the information received from the set top box devices to predict, based on the level of popularity that content has with other viewers in the marketing area 314, whether a viewer may also be interested in that content. As the viewing of a particular content title within a marketing area 314 increases as a percentage of the overall content views, then the likelihood that a particular viewer within that marketing area 314 would also be interested in viewing the content will be greater.

Examples of this type of content could be news related, such as a news story or notification of a natural disaster such as a hurricane, or an emergency such as a school evacuation or an accident. It may be a sports event such as a championship game played by a local area team, a league draft, or a post game analysis interview. It may be a special interest story, such as a celebration of a milestone in the community, the election of a new senator, or the dedication of a new building. It could also be a finale for a season or a series that has a large viewer following.

When module 406 determines that a content item reaches a threshold number of viewers in the geographic marketing area 314 such that a viewer should be notified of the content item, a notification is sent to the viewer 210 by the notify user module 402. In one or more embodiments the notification includes the title of the content, a query whether the user would like to immediately view the content or a query whether the user would like to record the content for later viewing. In another embodiment, the content item would be immediately recorded, for example on the digital video recording complement of the viewer's set top box 208, and the viewer 210 would be notified via the user's smartphone that the recording was awaiting viewing.

Figure 6:
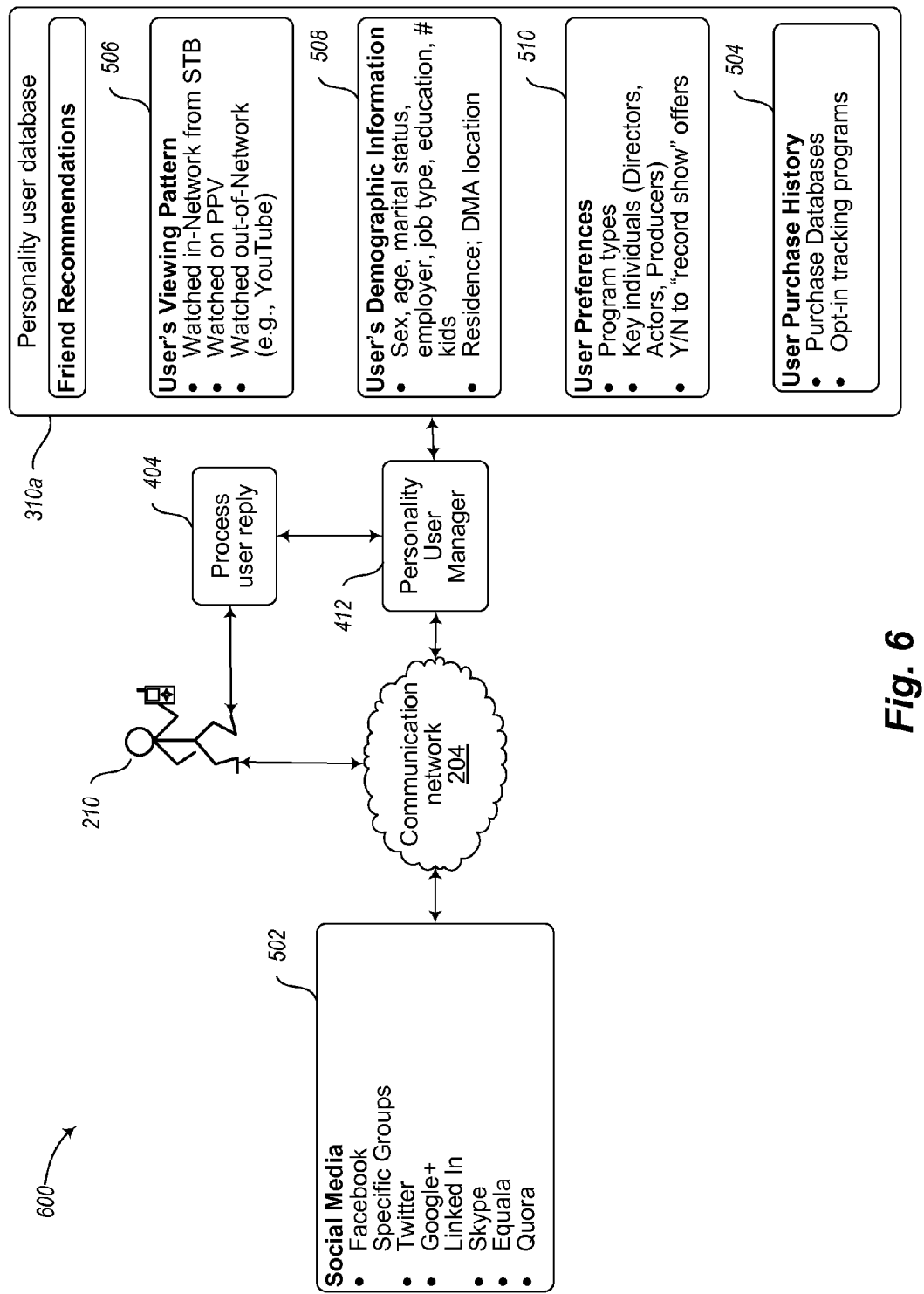
FIG. 6 is a schematic diagram of an example of a personality user manager component of a central control system server application.

FIG. 6 shows diagram 600 which describes one or more embodiments of personality user manager sub-module 412. The personality user manager creates, maintains and updates the personality user database 310a that contains data describing a viewer's content viewing preferences that is taken from a wide range of sources. This data is then used by the content comparator sub-module 410 against content title information in the content title database 304 to determine content that a viewer may want to be notified about.

The personality user database 310a for a particular viewer consists of multiple data sets that contain preference information that is gathered from diverse sources and that is used by the personality user manager 412 in determining overall viewer preferences. In one embodiment, a personality user database 310a may include a recommendations data set 52 that contains title suggestions and recommendations from a viewer's friends and contact lists. In some embodiments, these recommendations come from a general list of friends and their viewing likes and dislikes. In one or more embodiments, these recommendations come from social media sites 502 used by the viewer 210. Both the personality user manager 412 and viewer 210 would use communication network 204 to access a social media site. For example, a viewer may use Facebook, which in addition to a broad group of users friends could also include could include specific groups for sharing titles and recommending content for specific genres, such as science-fiction, drama, comedy, documentary, or other. Each Facebook user that belongs to the site may describe movies, series episodes, specials, or other titles that they enjoyed. In addition, the titles discussed on the social media site are not limited to titles available through any specific content provider 202. For example, social media discussions involving "Battle Star Galactica," which is available from a standard content provider, may also involve discussions of "Chrome and Blood" which is a series only available on the Internet. The recommendations data store 52 would capture the relationships of this related content available on different delivery systems, and notify the viewer 210 that the content is available and where it is available. These types of recommendations may be particularly relevant to a viewer because of the shared interests of the social media group. Therefore, a recommendation for a content title from one of these users would be more likely to match a viewer's preferred title and should be added to the personality user database 310a. In another embodiment, the personality user manager 412 may track what each user associated with a group within the viewer's social media site is currently viewing and send a message to the viewer 210 describing what the social media friend is viewing.

In addition, personality user manager 412 would also collect a viewing pattern data set 506. This data may come from querying the central control system 206 to determine titles that have been viewed, which may include regular shows watched, or shows watched on pay-per-view. In some embodiments, the data may come from the user's set top box 208 based on digital video recordings on the set top box and the number of times the user has viewed the recording. In other embodiments, user's viewing patterns may be taken from Internet content viewings, such as YouTube, Hulu, or Netflix videos. The personality user manager 412 could obtain this information through the communication network 204 from the viewer's Internet browser, or the viewer's account information associated with the Internet content viewing software, such as the viewer's YouTube channel.

A personality user database data set may also include the user's demographic information 508. This could include sex, age, marital status, employer, job type, education level, number of children, location of residence, credit report, credit history, household income, group affiliations, and other related information. The personality user manager 412 in some embodiments would use this information to determine content preferences. For example, men over the age of 210 tend to like football and the Super Bowl, therefore would have a preference for these titles to be pushed to their smartphone for viewing or later recording.

A personality user database data set may also include user preferences 510. In some embodiments, these preferences involve attributes of the content beyond title. For example, the user may specify a preference for a specific location such as Hawaii, Tahiti, Thailand and the like. Other preference examples include specific actors such as Scarlett Johansson or Ewan McGregor. A user might also enter preferences for program types, such as science fiction, crime drama, fantasy, documentary, sports, or other genre. User preferences may also include preferences for content where certain key individuals are involved. For example, a specific director such as Joss Whedon, which would result in matches for titles like "Firefly" or "The Cabin in the Woods," or a specific writers such as Aaron Sorkin which would result in matches for titles like "A Few Good Men" or "The Social Network" or Robert Chiappetta which would result in matches for series episodes of "Fringe."

In some embodiments, this preference information may be entered directly into the database by the user through a remote control connected to set top box 208, display device 302 connected to the central control system 206 or other connection through set top box 208. In other embodiments, this information may be entered by viewer 210 via the viewer's smartphone 211 to the personality user manager 412. Personality user manager 412 will take these user preferences and weight them as they are compared to content title database 304 by content comparators sub-module 410. The personality user manager 412, in conjunction with the personality server 408, preferably contains a waiting system that places different weight on the preferences of a user to increase the likelihood that information which is presented to a user will be preferred by the user. As just explained, the user 210 has the opportunity to input preference information themselves directly into the system through the user reply network 404. The user personality manager 412, therefore, that some of the preferences indicated have come directly from the user as response to the user voluntarily providing this information for a query. For example, a user may indicate that they prefer watching westerns and, in particular, westerns that star John Wayne. The user may also indicate video content which they greatly dislike. For example, users may indicate that they do not like any hip hop music, or that they never wish to see documentaries on World War II because of some prior adverse interaction with World War II. Thus, a user is able to enter directly into the personality manager 412 particular likes and dislikes. Such user indicated preferences are given a high weight, for example a weight of 1.0 in determining which video content information to offer to a user.

Further, video content which a user has stated they dislike, in the example provided hip hop music or documentaries of World War II, would be given a negative score, such as a negative 1.0 indicating that this type of information is to never be provided to the user. The personality manager 412 also obtains information via the communication network 204 from another of sources linked to a user. As shown in FIG. 6, this may include the social media groups 502 of which the user 210 is a member. This may include Facebook, Linked In, Skype, Twitter and a number of other social media groups. Within the social media network, the user will frequently indicate a like or dislike for a particular item. For example, the user on his Facebook page may indicate a like for a particular restaurant, a particular type of music, a particular program or certain types of media. Such likes by the user himself would also be given a relatively high preference, such as 0.8 or 0.7 since these were likes by the user himself and it can be inferred that the user has specifically indicated a like for that type of media, program, or Internet content. In addition, Facebook will show the number of friends and the type of friends of a particular user. For example, a particular user may have a very small circle of friends, less than 10, and all of the friends may be of a particular employment, such as construction workers. This provides additional information to the personality manager 412 on which decisions can be based on media content that may be presented to the viewer 210. In addition, the likes and dislikes of the friends of a Facebook user can be examined. If all of the viewers friends like exactly the same media, this can be taken as an indication that the viewer will also likely like this media even though the viewer himself one or the other on the particular media. However, the weighting factor placed on a like or dislike of a viewer's friend on a Facebook page will be less than a like or dislike that the viewer himself has made on a Facebook page, and a Facebook like or dislike will have a lower weighting than one the user personally entered themselves through the process user reply 404 into the personality manager 412. For example, the user's friends' likes and dislikes may have a weighting of approximately 0.4 or −0.4 respectively as compared to likes and dislikes which the user himself has entered on Facebook, which may have a weighting in the range of 0.7 or −0.7, etc. Repeated likes and dislikes of the very same type of media may add up and this would give that type of media a greater weighting overall even though the individual likes and dislikes have a low rating.

Generally, according to the principles as disclosed herein, the further that a particular preference is from the viewer 210 himself, the lower the weighting in making a decision whether or not to present potential viewing content recommendations to the viewer 210. For example, the user's viewing patterns in which the user himself is viewing a program, the user's demographic information and the user's self-entered preferences will generally be given a relatively high rate. Friends' recommendations will be given a lower rate, as will social media group outlets, although they will have sufficient weight to modify the decision. The user purchase history coupled with the timing of the user's purchase may be given significant weight. For example, if a particular media content is suggested to a user and within a short period of time they purchase that media content, this purchase, together with the timing of it shortly after the suggestion, will be stored in the database in order to modify the weighting of the various preferences and also to assist in determining which future suggestions to present to the viewer 210 for either purchasing, viewing media content purchasing items or the like. The overall social and specific groups of the user 210 will also be examined to determine potential preferences in viewing media content. For example, if all of the user groups to which a viewer 210 belongs include only males and all of them are related to male-dominant groups, then the personality user manager 412 will put a negative weighting on female-based groups or video content which is generally considered viewed by females. Conversely, the same factors are taken into account for a female viewer, a teenage viewer or other viewers which are within certain demographics. If a teenage viewer has only teenage friends on Facebook and all the friends are of a specific gender, such as male or female, then the social media which is presented to that viewer will be of the type most likely to appeal to a viewer with this set of friends and viewing habits.

The particular rating that is placed on any of the data can be modified according to the results which are obtained and vary over time. As mentioned, the user input factors will be given a heavy weight. Over time, which may be several months or several years, the viewer's pattern will be monitored and stored so that modifications may be made on the media content which is suggested to a particular viewer 210. For example, the system will recognize that of the many types of suggested media content which is provided to a viewer, which ones of those they have accepted and proceeded to view and which ones they have rejected. If a particular type of media content is routinely accepted and viewed, then this will be given a greater weighting in the personality user manager 412. On the other hand, each suggestion that is rejected will be stored and the media content which has similar characteristics of those which have been rejected will be reduced in their rating value so that over time the material which is suggested to the viewer 210 for viewing will be closer to the desired viewing habits of a particular viewer.

A personality user database data set may also include a viewer's purchase history 504 that can be used to determine a viewer's specific likes and dislikes for certain content. For example, if a user purchases skis, snowboards, associated gear, or lift tickets, this would indicate a viewer preference for winter sports related video content which may include sporting events, Warren Miller documentaries, or movies involving winter sports plots.

In some embodiments, this purchase history information may be gathered by personality user manager 412 through communications network 204 that is connected to sources that can provide purchasing information. For example, websites that contain a viewer's purchase history such as Quicken, payment websites such as VISA or American Express, or a user's banking portal website such as www.bofa.com may provide purchasing information. In other embodiments, the viewer 210 may use a smartphone device to send this purchase history information directly to personality user manager 412.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a computer processor circuit configured to:
   manage one or more personality user databases associated with one or more users in a first geographic marketing area to determine content preferences for the one or more users in the first geographic marketing area, the first geographic marketing area being one of a plurality of geographic marketing areas, each of the plurality of geographic marketing areas being associated with at least one user;
   manage one or more personality user databases associated with one or more users in a second geographic marketing area to determine content preferences for the one or more users in the second geographic marketing area;

manage a first marketing area viewing habits module associated with users in the first geographic marketing area to determine viewing habits of the one or more users in the first geographic marketing area, the first marketing area viewing habits module being configured to determine viewing habits by querying set top boxes in the first geographic marketing area for content selected for viewing by the one or more users in the first geographic marketing area;

manage a second marketing area viewing habits module associated with users in the second geographic marketing area to determine viewing habits of the one or more users in the second geographic marketing area, the second marketing area viewing habits module being configured to determine viewing habits by querying set top boxes in the second geographic marketing area for content selected for viewing by the one or more users in the second geographic marketing area;

identify content available for viewing from a content database;

identify a first plurality of matched content titles a user in the first geographic marketing area may have a preference for based on a comparison of the content available for viewing with a personality user database associated with the user in the first geographic marketing area, and further based on the viewing habits of other users in the first geographic marketing area;

identify a second plurality of matched content titles a user in the second geographic marketing area may have a preference for based on a comparison of the content available for viewing with a personality user database associated with the user in the second geographic marketing area, and further based on the viewing habits of other users in the second geographic marketing area;

send the first plurality of matched content titles to the user in the first geographic marketing area for display on a first mobile communication device;

send the second plurality of matched content titles to the user in the second geographic marketing area for display on a second mobile communication device;

receive a selection of the first plurality of matched content titles from the user in the first geographic marketing area;

receive a selection of the second plurality of matched content titles from the user in the second geographic marketing area; and perform an action with the selected content titles.

2. A system according to claim 1 wherein manage one or more personality databases associated with one or more users further comprises:
receive a list of content the user has viewed in the past;
store the list of content the user has viewed in the personality user database associated with the user.

3. A system according to claim 1 wherein perform an action with the selected content titles further comprises:
record the content on a digital video recorder associated with the user.

4. A system according to claim 1, further comprising:
update the personality user database associated with the user to reflect the selection of the plurality of matched content titles from the user.

5. A method, comprising:
managing, by at least one processor, one or more personality databases associated with a user in a first geographic marketing area to determine content preferences for the user, wherein the first geographic marketing area is one of a plurality of geographic marketing areas, each of the plurality of geographic marketing areas being associated with at least one user;

managing, by the at least one processor, one or more personality databases associated with a user in a second geographic marketing area to determine content preferences for the user in the second geographic marketing area;

managing, by the at least one processor, a first marketing area viewing habits module associated with users in the first geographic marketing area to determine viewing habits of users in the first geographic marketing area, the first marketing area viewing habits module being configured to determine viewing habits by querying set top boxes in the first geographic marketing area for content selected for viewing by the users in the first geographic marketing area;

managing, by the at least one processor, a second marketing area viewing habits module associated with users in the second geographic marketing area to determine viewing habits of users in the second geographic marketing area, the second marketing area viewing habits module being configured to determine viewing habits by querying set top boxes in the second geographic marketing area for content selected for viewing by the users in the second geographic marketing area;

identifying, by the at least one processor, content available for viewing from a content database;

identifying, by the at least one processor, a first plurality of matched content titles the user in the first geographic marketing area may have a preference for based on a comparison of the content available for viewing with a personality user database associated with the user in the first geographic marketing area, and further based on the viewing habits of other users in the first geographic marketing area;

identifying, by the at least one processor, a second plurality of matched content titles the user in the second geographic marketing area may have a preference for based on a comparison of the content available for viewing with a personality user database associated with the user in the second geographic marketing area, and further based on the viewing habits of other users in the second geographic marketing area;

sending the first plurality of matched content titles to the user in the first geographic marketing area for display on a first mobile communication device;

sending the second plurality of matched content titles to the user in the second geographic marketing area for display on a second mobile communication device;

receiving a selection of the first plurality of matched content titles from the user in the first geographic marketing area;

receiving a selection of the second plurality of matched content titles from the user in the second geographic marketing area; and performing an action with the selected content titles.

6. A method according to claim 5 wherein performing an action with the selected content titles further comprises:
recording content associated with the selected content titles on a digital video recorder associated with the user.

7. The method according to claim 5 wherein managing one or more personality databases associated with the user further comprises:
   receiving a list of content the user has viewed in the past;
   storing the list of content the user has viewed in the personality user database associated with the user.

8. The method according to claim 5 wherein performing an action with the selected content titles further comprises:
   displaying content associated with the selected content titles on a display associated with a set top box.

9. The method according to claim 5 wherein performing an action with the selected content titles further comprises:
   displaying the content associated with the selected content titles on the mobile communication device.

10. The method according to claim 5 wherein performing an action with the selected content titles further comprises:
    recording content associated with the selected content titles on a digital video recorder associated with the user.

11. The method according to claim 5, further comprising:
    updating the personality user database associated with the user to reflect the selection of the plurality of matched content titles.

12. The system according to claim 1, wherein perform an action with the selected content titles further comprises:
    display content associated with the selected content titles on a display associated with a set top box.

13. The system according to claim 1 wherein perform an action with the received selected content titles further comprises:
    display content associated with the selected content titles on the mobile communications device.

* * * * *